United States Patent
Shulver et al.

(10) Patent No.: US 7,037,088 B2
(45) Date of Patent: May 2, 2006

(54) DUAL BALANCE SHAFT PUMP ASSEMBLY

(75) Inventors: David Shulver, Toronto (CA); Dan Sarkanjac, Etobicoke (CA); Wei Tang, Brampton (CA)

(73) Assignee: Tesma International Inc., Concord (CA)

( * ) Notice: Subject to any disclaimer, the term of this patent is extended or adjusted under 35 U.S.C. 154(b) by 300 days.

(21) Appl. No.: 10/447,043

(22) Filed: May 28, 2003

(65) Prior Publication Data

US 2004/0028537 A1 Feb. 12, 2004

Related U.S. Application Data

(60) Provisional application No. 60/385,404, filed on May 31, 2002.

(51) Int. Cl.
*F04B 17/00* (2006.01)
(52) U.S. Cl. ................ 417/364; 123/196 R; 123/192.2
(58) Field of Classification Search ................ 417/364; 123/196 R, 192.2
See application file for complete search history.

(56) References Cited

U.S. PATENT DOCUMENTS

| | | | |
|---|---|---|---|
| 5,535,643 A | | 7/1996 | Garza |
| 5,791,309 A | | 8/1998 | Yamazaki et al. |
| 5,918,573 A | * | 7/1999 | Killion ..................... 123/192.2 |
| 6,189,499 B1 | * | 2/2001 | Iwata et al. .............. 123/192.2 |
| 6,205,970 B1 | * | 3/2001 | Iwata et al. .............. 123/192.2 |
| 6,371,071 B1 | * | 4/2002 | Iwata ....................... 123/192.2 |
| 6,601,557 B1 | * | 8/2003 | Hayman et al. ......... 123/192.2 |

FOREIGN PATENT DOCUMENTS

| | | |
|---|---|---|
| EP | 1319809 A1 | 6/2003 |
| JP | 2001-99233 | 4/2001 |
| WO | WO 00/15976 | 3/2000 |

* cited by examiner

*Primary Examiner*—Charles G. Freay
(74) *Attorney, Agent, or Firm*—Clark Hill PLC

(57) ABSTRACT

A dual fluid pump assembly driven by respective shafts of a dual balancing shaft assembly for an engine of an automotive vehicle. A shaft housing rotatably supports primary and secondary balancing shafts of the dual balancing shaft assembly. The shafts are coupled by a gear train for rotating the primary and secondary balance shafts in opposite directions. Each shaft includes a distal end for supporting and driving a fluid pump. A pump housing is fixedly secured to the shaft housing for enclosing the fluid pump and retaining fluid therebetween. The pumps are disposed adjacent the shaft housing and within a seal formed by the shaft housing and pump housing.

9 Claims, 2 Drawing Sheets

DUAL BALANCE SHAFT PUMP ASSEMBLY

This appln. claims the benefit of 60/385,404, filed May 31, 2002.

BACKGROUND OF THE INVENTION

1. Field of the Invention

The invention relates to a fluid pump system for an engine in an automotive vehicle, and more particularly, to a dual fluid pump system wherein each pump is driven by a respective shaft of a dual balance shaft system in the engine.

2. Description of the Prior Art

Automotive vehicles typically include a fluid pump assembly for circulating and delivering oil to the moving components of an engine. It is well known in the art to drive the fluid or oil pump assembly with a crankshaft from the engine.

An engine may also include a dual balance shaft assembly for reducing engine vibration and noise due to reciprocating pistons and rods in the engine. The engine crankshaft typically drives the dual balance shaft assembly. The dual balance shafts are driven in opposite directions by the crankshaft to offset each other's inertial moments and offset vibrations due to the reciprocal motion of the pistons and rods. However, it is common for the dual balance shaft assembly to cause vibration and noise within the engine. It is known to drive an oil pump assembly with a shaft from a balancing shaft assembly of the engine, rather than using the crankshaft for minimizing vibration and noise due to the rotation the dual balance shafts. Typically, the dual balance shaft assembly is enclosed between first and second halves of a balance shaft housing and the oil pump assembly is enclosed between first and second halves of an oil pump housing. The balance shaft and oil pump housings are fixedly secured to each other by bolts.

It remains desirable to provide an oil pump assembly that reduces vibration and noise due to the dual balance shaft assembly, while providing increased oil pump efficiency over conventional oil pump designs. Further, it remains desirable to provide a simplified, cost effective dual balance shaft and oil pump assembly that uses fewer components than conventional dual balance shaft and oil pump assembly designs.

SUMMARY OF THE INVENTION

According to one aspect of the invention, a balance shaft and fluid pump assembly for an engine of an automotive vehicle is provided including a balance shaft housing extending between opposite first and second ends. The balance shaft housing terminates at the first end at a face. A balance shaft is journaled between the first-and second ends of the balance shaft housing and has a distal end extending axially from the first end beyond the face of the balance shaft housing. A fluid pump housing is fixedly secured to the first end of the balance shaft housing for defining a fluid seal. A fluid pump is operatively coupled to the distal end of the balance shaft for driving the fluid pump by rotation of the balance shaft. The fluid pump is disposed within the seal and adjacent the face of the balance shaft housing.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
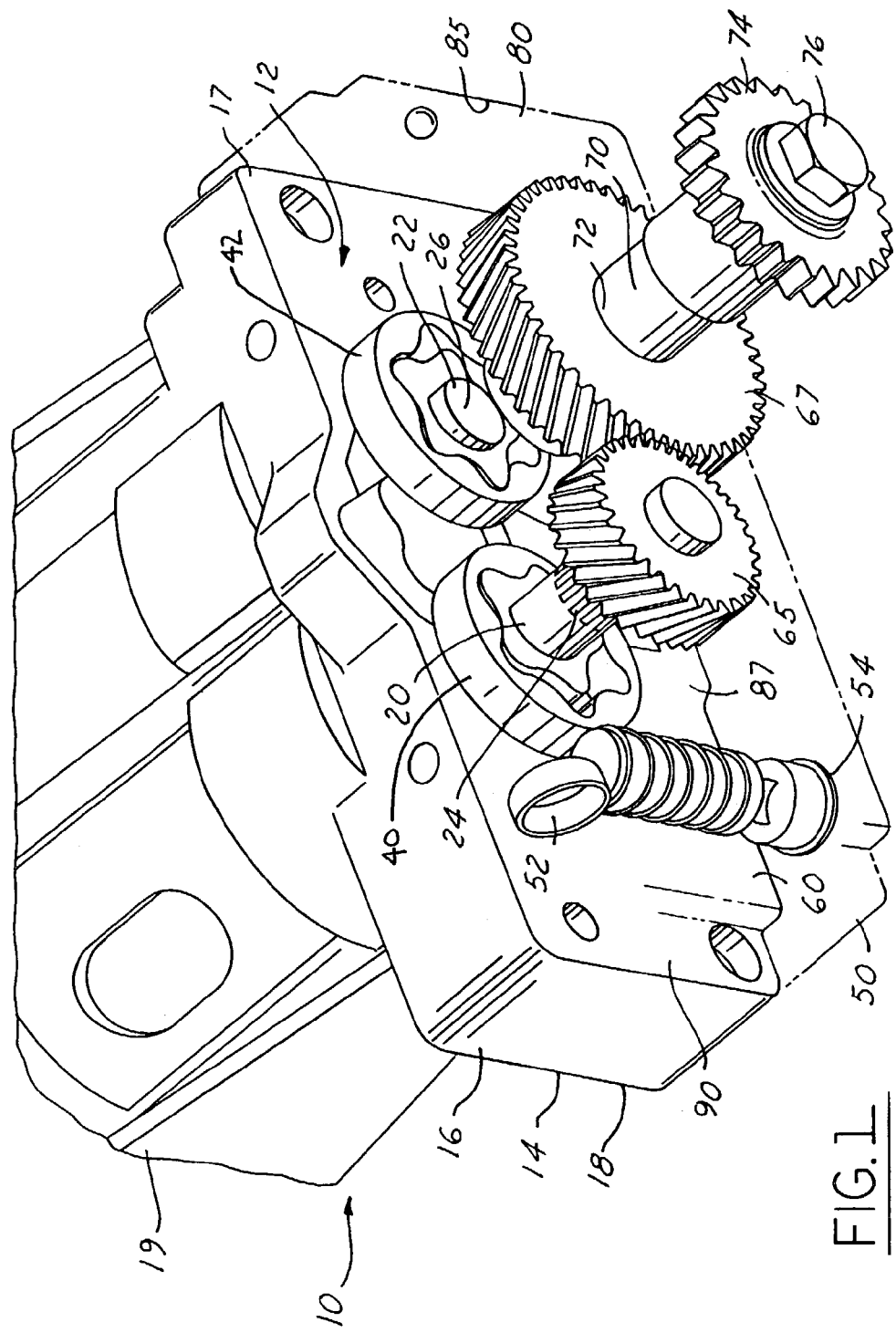
FIG. 1 is a partial perspective view of a dual balance shaft and fluid pump assembly for an engine of an automotive vehicle.
Figure 2:
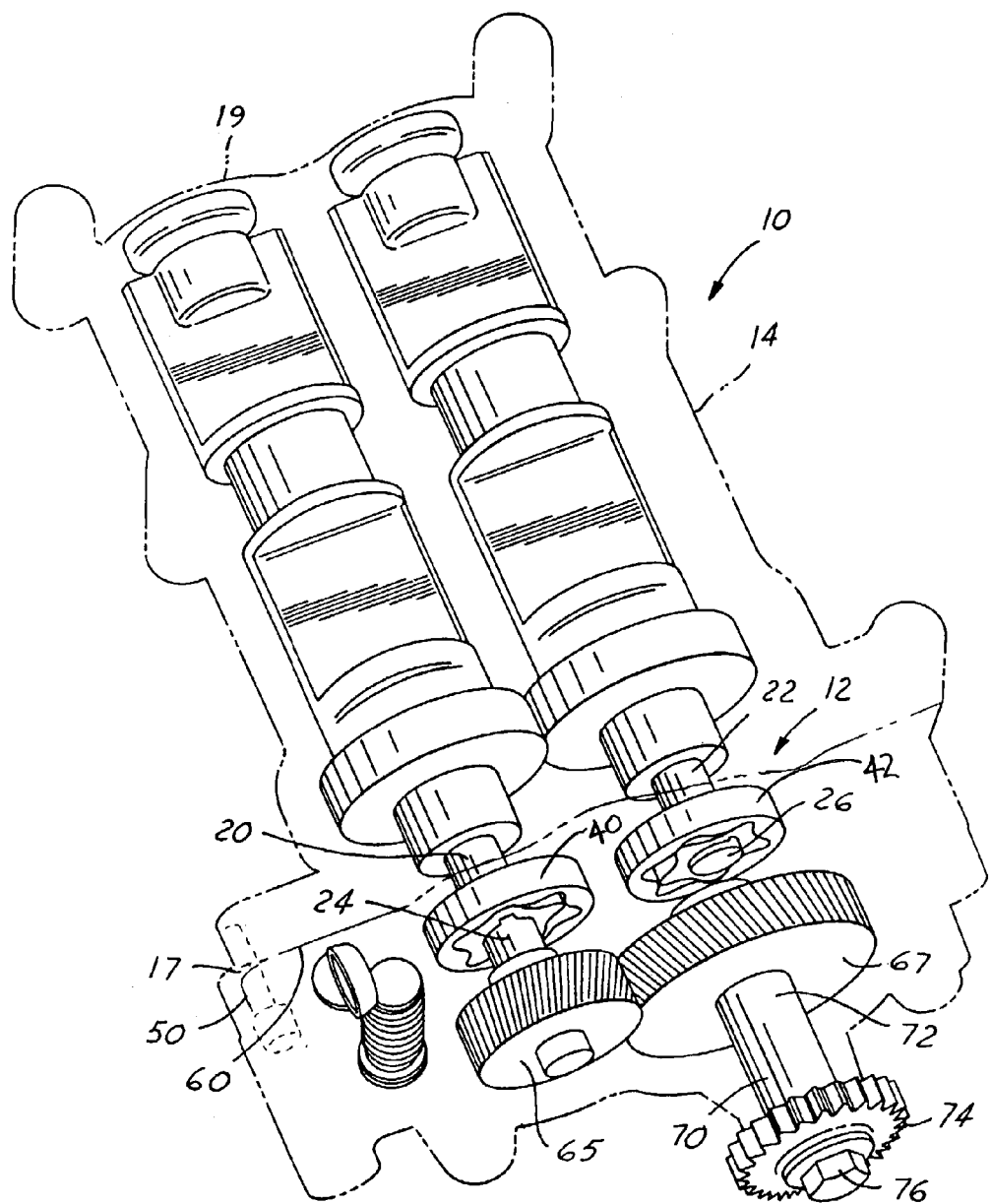
FIG. 2 is a top perspective view of a dual balance shaft and fluid pump assembly for an engine of an automotive vehicle.

Referring to FIG. 1, there is shown a dual balance shaft assembly 10 and a dual oil pump assembly 12 for an automotive engine of the present invention. The dual balance shaft assembly 10 includes a shaft housing 14 having upper and lower halves 16, 18 each extending between opposite first and second ends 17, 19. A primary shaft 20 and a secondary shaft 22 are rotatably journaled between the upper and lower halves 16, 18 at the first and second ends 17, 19 of the shaft housing 14 for rotational movement within a cavity defined between the upper and lower halves 16, 18. Within the cavity of the shaft housing 14, the primary and secondary shafts 20, 22 are coupled by a gear assembly as best seen in FIG. 2, for rotating the secondary shaft 22 in the opposite direction as the primary shaft 20 in response to rotation of the primary shaft 20. Both the primary and secondary shafts 20, 22 include distal ends 24, 26 extending axially outwardly from the first end 17 beyond a face 60 of the shaft housing 14.

In a preferred aspect of the present invention, the distal end 24 of the primary shaft 20 extends axially beyond the pump housing 50 and includes a sprocket 65 that mates with a sprocket 67 of an intermediate shaft 70. The intermediate shaft 70 has the sprocket 67 disposed at a first end 72 and a gear 74 disposed on the second end 76. The gear 74 is driven by a crankshaft (not shown), or alternatively a belt or chain from the engine. In this manner a rotational force is transferred to the primary shaft 20 which in turn drives the secondary shaft 22 of the dual balance shaft assembly 10. While the pictured preferred embodiment utilizes an intermediate shaft 70 to transfer force from a crankshaft, other drive mechanisms may be utilized by the present invention. For example, the primary shaft 20 may be directly linked to the crankshaft without the use of an intermediate shaft 70.

A pump housing 50 is fixedly secured to the first end 17 of the shaft housing 14 by bolts to form a seal 90 and retain fluid between the shaft and pump housings 14, 50. In a preferred aspect of the present invention the pump housing 50 comprises a single piece body having inner and outer surfaces 80, 85. The seal 90 comprises a cavity 87 defined by the face 60 of the balance shaft housing 14 and the inner surface 80 of the pump housing 50. A gasket may be sandwiched between the shaft and pump housings 14, 50 to improve the retention of fluid within the seal 90.

The pump housing 50 includes an inlet 52 and outlet 54 for allowing circulation of fluid in and out of the housing 50 caused by the operation of the pumps 40, 42, which will discussed in more detail below. In a preferred aspect, the outlet 54 includes a pressure relief valve associated therewith to maintain an oil demand for the engine.

A primary fluid pump 40 is mounted to and driven by the primary shaft 20 at the distal end 24 of the shaft 20 beyond the first end 17 of the shaft housing 14 and adjacent the face 60. Similarly, a secondary fluid pump 42 is mounted to and driven by the distal end 26 of the secondary shaft 22, adjacent the face 60. The primary and secondary fluid pumps 40, 42 are positioned with in the seal 90 to transport fluid within the seal to the engine. The positioning of the primary and secondary pumps adjacent the face 60 of the shaft housing 14 reduces the overall size of the dual oil pump assembly 12. Also a cost savings may be realized by eliminating pumps having a separate two-piece housing that is mounted to the dual balance shaft assembly 12. In a preferred aspect of the present invention, the primary and secondary fluid pumps 40, 42 are gerotor-type fluid pumps, as commonly known by those having ordinary skilled in the art. Other pumps, such as gear pumps, vane pumps or crescent pumps may be utilized by the present invention. Also, while the pictured preferred embodiment utilizes primary 40 and secondary 42 pumps, a single pump may also be utilized that is linked to the primary shaft, as previously described above, without the use of a secondary pump 42.

In operation, the primary shaft 20 is driven by the intermediate shaft 70 which in turn is driven by the crankshaft from the engine. The gear assembly within the balance shaft housing 14 linking the primary 20 and secondary 22 shafts causes the secondary shaft 22 to rotate in response to the rotation of the primary shaft 20. The primary and secondary shafts 20, 22 rotate in opposite directions. The rotational speed of the primary and secondary shafts 20, 22 changes in direct proportion to the rotational speed of the crank shaft 32. Rotation of the primary and secondary shafts 20, 22 actuates the primary and secondary pumps 40, 42 located adjacent the front face 60 of the shaft housing 14 to circulate fluid between the inlet and outlet 52, 54 of the pump housing 50. The seal 90 formed between the shaft and pump housing 14, 50 retains the fluid between the shaft and pump housings 14, 50 for movement by the pumps 40, 42.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A balance shaft and fluid pump assembly for an engine of an automotive vehicle comprising:
    a balance shaft housing extending between opposite first and second ends, the housing terminating at a face at the first end;
    first and second balance shafts positioned parallel to one another and each journaled between the first and second ends of the balance shaft housing for rotation in opposite directions, each of the first and second balance shafts having a distal end extending axially from the face of the balance shaft housing;
    a fluid pump housing fixedly secured to the first end of the balance shaft housing for defining a fluid seal; and
    primary and secondary fluid pumps mounted on the distal end of the respective first and second balance shafts for driving the primary and secondary fluid pumps by rotation of the first and second balance shafts, the primary and secondary fluid pumps being disposed within the seal and adjacent the face of the balance shaft housing.

2. The balance shaft and fluid pump assembly of claim 1 wherein the balance shaft housing comprises upper and lower portions extending between the opposite first and second ends.

3. The balance shaft and fluid pump assembly of claim 1 wherein each of the primary and secondary fluid pumps comprise gerotor fluid pumps.

4. The balance shaft and fluid pump assembly of claim 1 wherein the fluid pump housing comprises a single piece body attached to the balance shaft housing.

5. The balance shaft and fluid pump assembly of claim 1 wherein the fluid seal comprises a cavity defined by the face of the balance shaft housing and an inner surface of the fluid pump housing.

6. The balance shaft and fluid pump assembly of claim 5 wherein the fluid pump housing includes an inlet and outlet formed from an outer surface of the housing through the inner surface of the housing.

7. The balance shaft and fluid pump assembly of claim 6 wherein the outlet includes a pressure relief valve for maintaining an oil demand in an engine.

8. A balance shaft and fluid pump assembly for an engine of an automotive vehicle comprising:
    a balance shaft housing extending between opposite first and second ends, the housing terminating at a face at the first end;
    first and second balance shafts positioned parallel to one another and each journaled between the first and second ends of the balance shaft housing for rotation in opposite directions, each of the first and second balance shafts having a distal end extending axially from the face of the balance shaft housing;
    a fluid pump housing fixedly secured to the first end of the balance shaft housing for defining a fluid seal, the seal comprising a cavity defined by the face of the balance shaft housing and an inner surface of the fluid pump housing; and
    primary and secondary fluid pumps mounted on the distal end of the respective first and second balance shafts for driving the primary and secondary fluid pumps by rotation of the first and second balance shafts, the primary and secondary fluid pumps being disposed within the seal and adjacent the face of the balance shaft housing.

9. A balance shaft and fluid pump assembly for an engine of an automotive vehicle comprising:
    a balance shaft housing extending between opposite first and second ends, the housing comprising upper and lower portions extending between the opposite first and second ends and terminating at a face at the first end;
    first and second balance shafts positioned parallel to one another and each journaled between the first and second ends of the balance shaft housing for rotation in opposite directions, each of the first and second balance shafts having a distal end extending axially from the face of the balance shaft housing;
    a fluid pump housing comprising a single piece body fixedly secured to the first end of the balance shaft housing for defining a fluid seal; and
    primary and secondary fluid pumps mounted on the distal end of the respective first and second balance shafts for driving the primary and secondary fluid pumps by rotation of the first and second balance shafts, the primary and secondary fluid pumps being disposed within the seal and adjacent the face of the balance shaft housing.

* * * * *